(12) United States Patent
Jeong

(10) Patent No.: US 6,947,360 B2
(45) Date of Patent: Sep. 20, 2005

(54) METHOD AND APPARATUS FOR TILT DETECTION IN AN INFORMATION-RECORDING MEDIUM

(75) Inventor: Seong Yun Jeong, Kyeonggi-do (KR)

(73) Assignee: LG Electronics Inc., Seoul (KR)

( * ) Notice: Subject to any disclaimer, the term of this patent is extended or adjusted under 35 U.S.C. 154(b) by 361 days.

(21) Appl. No.: 10/082,220

(22) Filed: Feb. 26, 2002

(65) Prior Publication Data

US 2002/0118615 A1 Aug. 29, 2002

(30) Foreign Application Priority Data

Feb. 28, 2001 (KR) ........................................ 2001-10504

(51) Int. Cl.[7] ................................................. G11B 7/00
(52) U.S. Cl. ............................... 369/44.32; 369/53.19; 369/44.41
(58) Field of Search ........................... 369/53.19, 44.32, 369/44.41

(56) References Cited

U.S. PATENT DOCUMENTS

| | | | | |
|---|---|---|---|---|
| 5,136,567 A | * | 8/1992 | Nagahara et al. | 369/44.41 |
| 5,515,348 A | * | 5/1996 | Ohsato | 369/44.32 |
| 5,523,989 A | * | 6/1996 | Ishibashi | 369/44.32 |
| 6,363,038 B1 | * | 3/2002 | Yanagawa | 369/44.32 |
| 2002/0080692 A1 | * | 6/2002 | Nagaoka et al. | 369/44.32 |

FOREIGN PATENT DOCUMENTS

| | | | | |
|---|---|---|---|---|
| JP | 62052735 A | * | 3/1987 | G11B/7/09 |
| JP | 01007331 A | * | 1/1989 | G11B/7/09 |

\* cited by examiner

*Primary Examiner*—Brian E. Miller
*Assistant Examiner*—Peter Vincent Agustin
(74) *Attorney, Agent, or Firm*—Birch Stewart Kolasch & Birch LLP

(57) ABSTRACT

A tilt detecting apparatus of an information-recording medium having a photo diode for detecting a light reflected from an information-recording medium and outputting a light amount signal according to the detected light amount; and a calculating unit for calculating a radial tilt amount by using the light amount signal, wherein the photodiode is divided into a plurality of cells which are identified as regions according to a light amount of the reflected light, based on which a tilt signal is detected. A portion of the reflected light diffracted at the information-recording medium is detected by using the 8-divided photo diode, the region having a large difference in a light amount by the tilt and the region having a small difference in a light amount by the tilt in view of the characteristic of the reflected light are detected. And then, after push-pull values of each region are computed to remove an influence of the radial shift by using the two push-pull values, a corresponding difference between the tilt amounts, thereby obtaining an accurate tilt direction and degree of the information-recording medium.

14 Claims, 7 Drawing Sheets

METHOD AND APPARATUS FOR TILT DETECTION IN AN INFORMATION-RECORDING MEDIUM

BACKGROUND OF THE INVENTION

1. Field of the Invention

The present invention relates to an optical system for optical recording, reproducing or erasing in an information-recording medium, and more particularly to a method and apparatus for tilt detection in said optical system.

2. Description of the Background Art

FIG. 1 is a view showing a conventional optical pick-up apparatus for an optical system.

As shown in FIG. 1, the optical pick-up 200 includes a laser diode 260 for generating light irradiated on the information-recording medium, a collimate lens 250 for changing the light generated from the laser diode 260 to a parallel light; a beam splitter 220 for refracting the optical axis of the parallel light to 90°, an objective lens 210 for collecting the refracted light and irradiating the refracted light on a track of the information-recording medium; a light-receiving lens 230 for forming an image of the reflected light on a photodiode when the light irradiated on the track of the information-recording medium is reflected from the information-recording medium; and a photodiode 240 for outputting a light amount signal corresponding to the light amount of the reflected light.

FIG. 2 is a view showing a diffraction pattern of the light beam when there is not a tilt or a radial tilt.

FIG. 3A and FIG. 2 are a view showing a diffraction pattern of the light beam when there is a tilt or a radial shift, respectively. As shown in FIG. 3A and FIG. 3B, the diffraction pattern of the light beam shows an asymmetric distribution. In this respect, the darker portion of the drawing indicates a lesser amount of light.

FIG. 4 is a view showing four divided photo diodes (A, B, C and D) in accordance with the conventional art.

As shown in FIG. 4, when the push-pull method, i.e. one of methods for detecting the degree that the currently irradiated light is deviated from the track, is employed, a push-pull value is expressed by a difference between the sum of the light amount detected from the photo diode 240 (A, D) and the sum of the light amount detected from the photo diode 240 (B, C). When it is taken as a formula, it can be expressed by p_p=(A+D)−(B+C).

When the light is irradiated at an accurate position of the track, as shown in FIG. 2, since the left and right light amount of the diffraction pattern are the same, the push-pull value is '0'. On the other hand, when irradiated off the accurate position of the track, the diffraction pattern shows an asymmetric distribution so as to yield a positive or a negative value of the push-pull value. Accordingly, it can be determined how far the presently irradiated light is deviated from the track according to the sign.

However, even though the light is accurately irradiated on the track of the information-recording medium 100, if the information-recording medium 100 is slanted, the light amounts of the left and right sides are different to each other. And when there happens a radial shift with an objective lens moving along the track, the diffraction pattern shows an asymmetric distribution so as to yield a positive or a negative value of the push-pull value. Accordingly, it is not possible to know from the resultant push-pull value whether the asymmetric distribution is owing to the disk tilt or the radial tilt.

In other words, as shown in FIGS. 5A and 5B, since the tilt amount for the push-pull value and the slope of the radial shift amount are similar, there is little difference between the push-pull value according to the tilt amount and the push-pull value according to the radial shift amount.

SUMMARY OF THE INVENTION

Therefore, an object of the present invention is to provide an optical pickup apparatus of an information-recording medium that is capable of precisely obtaining a direction and a degree of a tilt against the information-recording medium where the tilt and a shift are mixed.

To achieve these and other advantages and in accordance with the purpose of the present invention, as embodied and broadly described herein, there is provided an optical pickup apparatus of an information-recording medium having a photo diode for detecting a light reflected from an information-recording medium and outputting a light amount signal according to the detected light amount; and a calculating unit for calculating a radial tilt amount by using the light amount signal, wherein the photodiode is divided into a plurality of cells which are identified as regions according to a light amount of the reflected light, based on which a tilt signal is detected.

To achieve the above objects, there is further provided a tilt detecting method of an information-recording medium including the steps of: detecting a light amount of a region having a large change in a light amount and a light amount of a region having a small change in a light amount according to a variation of a tilt amount, by means of a photo diode; calculating a push-pull value of each region; and removing an influence of a radial shift by using the two push-pull values and obtaining a difference of the tilt amount.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A tilt detecting apparatus of the present invention is featured in that after a region having a large light amount variation and a region having a little light amount variation according to a variation of a tilt amount are detected by using a 8-divided photo diode, a push-pull value of each region is calculated, and an influence of a radial shift is removed by using the two push-pull values, and then a difference of the tilt amount to thereby detect an accurate tilt amount.

The operation of the tilt detecting apparatus will now be described in detail with reference to accompanying drawings.

Figure 6:
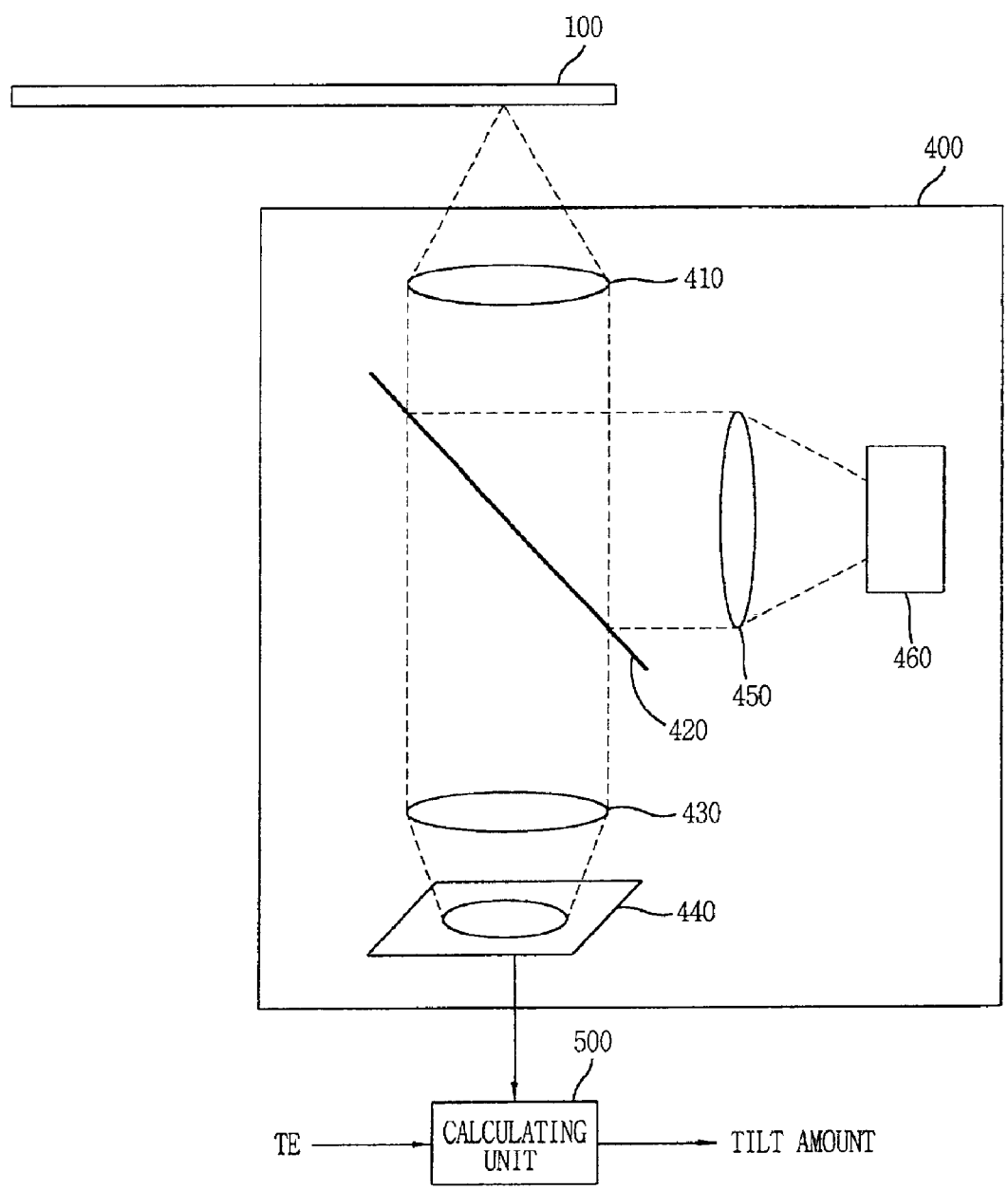
FIG. 6 is a view showing the construction of a tilt detecting apparatus in accordance with a preferred embodiment of the present invention.

FIG. 6 is a view showing the construction of a tilt detecting apparatus in accordance with a preferred embodiment of the present invention.

As shown in FIG. 6, a tilt detecting apparatus includes an information-recording medium 100; an optical pick-up 400 for detecting a slope of a light beam irradiated on the recording layer of the information-recording medium against an optical axis; and a calculating unit 500 for receiving a light amount signal and a tracking error signal from the optical pick-up 400, performing a calculation and outputting a tilt amount.

The optical pick-up 400 includes a laser diode 460 for generating a light to be irradiated on the information-recording medium 100, a collimate lens 450 for changing the light generated from the laser diode 460 to a parallel light; a beam splitter 420 for refracting an optical axis of the parallel light to 90°; an objective lens 410 for collecting the refracted light and irradiating it on the information-recording medium 100; a light-receiving lens 430 for forming an image on a photo diode 440 by the reflected light as the light irradiated on the track of the information-recording medium 100 is reflected from the information-recording medium 100; and the photo diode 440 for outputting a light amount signal corresponding to the light amount of the reflected light.

Figure 1:
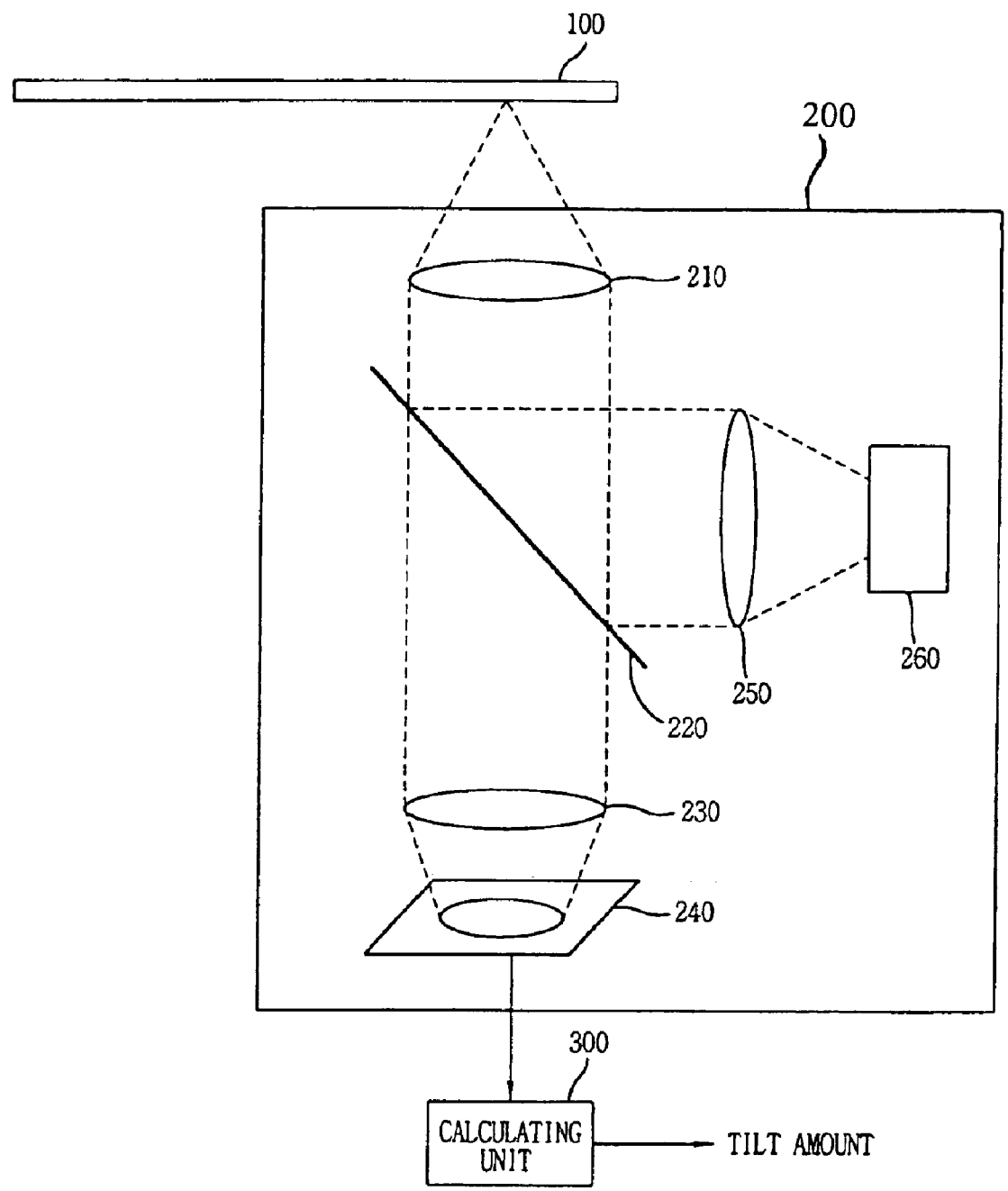
FIG. 1 is a view showing the construction of an optical pickup apparatus in accordance with a conventional art.

The tilt detecting apparatus of the present invention has the same construction as that of the conventional art as shown in FIG. 1, except that the former has the photo diode 440 and the calculating unit 500, descriptions of which, thus, are omitted.

Figure 7:
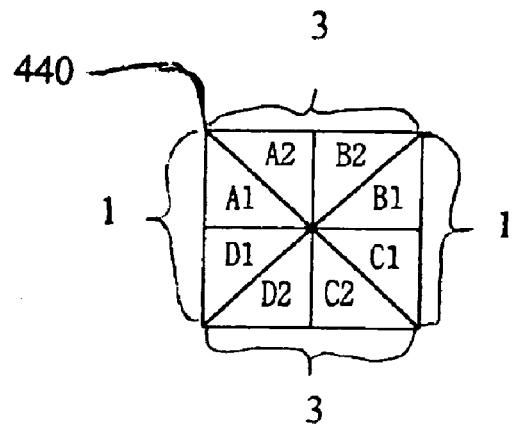
FIG. 7 is a view showing a 8-divided photo diode in accordance with the preferred embodiment of the present invention.

FIG. 7 is a view showing an 8-divided photo diode in accordance with the preferred embodiment of the present invention.

As shown in FIG. 7, the 8-divided photo diode 440 includes eight divided diodes (A1, A2, B1, B2, C1, C2, D1, D2) as the four-divided photo diode regions are also diagonally divided.

The 8-divided photodiode 440 is adopted to the optical pick-up 400, the light of the first diffraction region 1 having much difference in the light amount by the tilt and the light of the third diffraction region 3 having a little difference in the light amount by the tilt can be separately detected.

Figure 2:
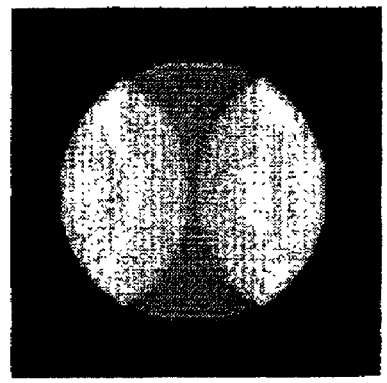
FIG. 2 is a view showing a diffraction pattern of the light beam when a tilt or a radial shift is not generated in a land and a groove of the information-recording medium.
Figure 3A:
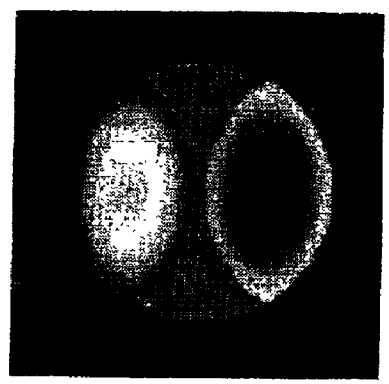
FIG. 3A is a view showing a diffraction pattern of the light beam when a tilt is generated in a land and a groove of the information-recording medium.
Figure 3B:
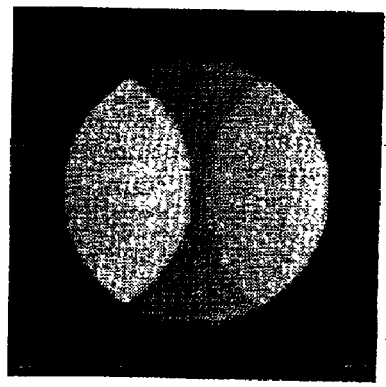
FIG. 3B is a view showing a diffraction pattern of the light beam when a radial shift is generated in a land and a groove of the information-recording medium.
Figure 4:
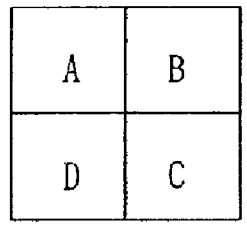
FIG. 4 is a view showing a four-divided photodiode in accordance with the conventional art.
Figure 5A:
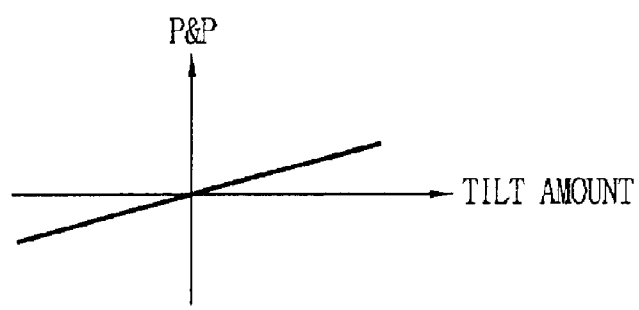
FIGS. 5A and 5B are graphs showing push-pull values (P_P) according to a variation of a tilt amount and push-pull values (P_P) according to a variation of a radial shift amount.
Figure 5B:
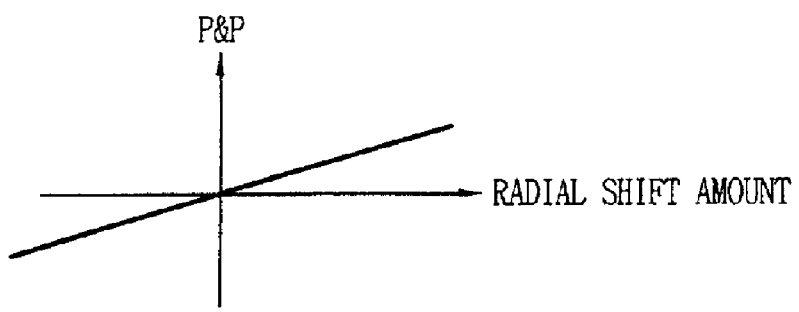

In detail, in case of using the 8-divided photo diode 440, the push-pull value is expressed by a difference of the left and right light amounts of the diffraction patterns as shown in FIGS. 2 and 3. Accordingly, a difference between the sum of light amount of the left regions of the photo diode 440 (A1, A2, D1, D2) and the sum of light amount of the right regions of the photo diode 440 (B1, B2, C1, C2) is obtained. This is expressed by an equation (1):

$$P\_P=(A1+A2+D1+D2)-(B1+B2+C1+C2) \quad (1)$$

As mentioned above, since the first diffraction region 1 is where the light amount is much changed by the tilt of the information-recording medium 100, the light amount difference according to the change of the diffraction pattern by the tilt is concentrated on the regions A1, B1, C1 and D1 of the photo diode 440. In this manner, the left and right light amount difference is obtained by using the regions with the great change of the light amount, which can be expressed by equation (2):

$$P1=(A1+D1)-(B1+C1) \quad (2)$$

A difference of left and right light amounts is obtained by using the regions with the small change of light amount, which can be expressed by equation (3):

$$P2=(A2+D2)-(B2+C2) \quad (3)$$

Figure 8A:
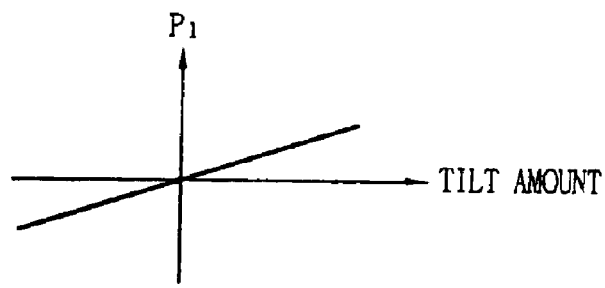
FIGS. 8A and 8B are views showing a partial push-pull value (P1) according to a variation of a tilt amount and a partial push-pull value (P1) according to a variation of a radial shift amount.
Figure 8B:
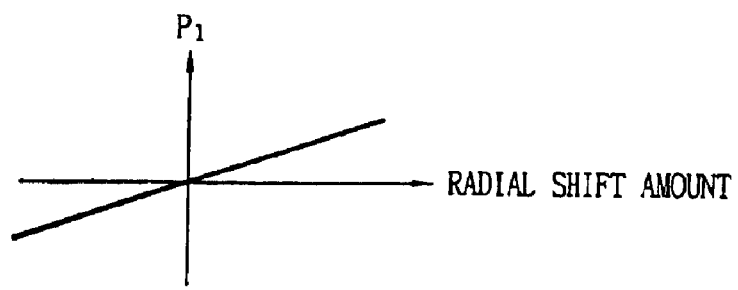

FIGS. 8A and 8B are views showing a partial push-pull value (P1) according to a variation of a tilt amount an d a partial push-pull value (P1) according to a variation of a radial shift amount.

As shown in FIGS. 8A and 8B, there is little difference in the partial push-pull values (P1) according to the tilt amount and the radial shift amount.

Namely, the influence of the tilt made to the partial push-pull value (P1) or the influence of the radial shift to the partial push-pull value (P1) are similar.

However, the case of a partial push-pull value (P2) is different.

Figure 9A:
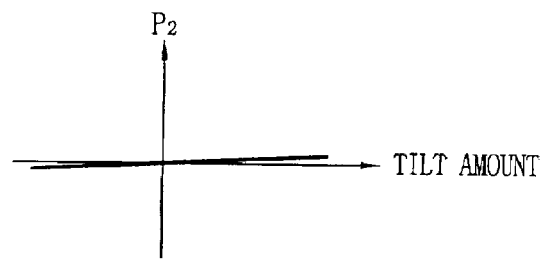
FIGS. 9A and 9B are views showing a partial push-pull value (P2) according to a variation of a tilt amount and a partial push-pull value (P2) according to a variation of a radial shift amount.
Figure 9B:
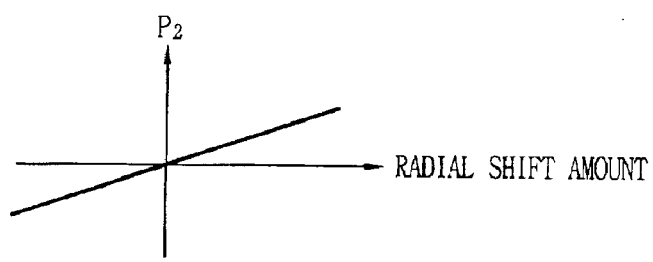

FIGS. 9A and 9B are views showing a partial push-pull value (P2) according to a variation of a tilt amount and a partial push-pull value (P2) according to a variation of a radial shift amount.

As shown in FIGS. 9A and 9B, the partial push-pull value (P2) is little influenced by the tilt amount, while it is much influenced by the radial shift amount.

In this relation, the influence from the radial shift can be minimized by equation (4):

$$T=P1-kP2=[(A1+D1)-(B1+C1)]-k[(A2+D2)-(B2+C2)] \quad (4)$$

wherein 'k' is a constant to minimize the influence of the radial shift.

This will now be described with reference to FIGS. 10A and 10B.

Figure 10A:
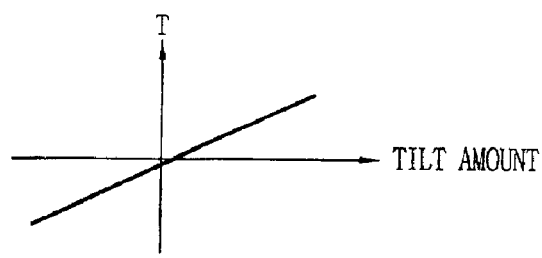
FIG. 10A is a graph showing a value 'T' according to a variation of a tilt amount when a radial shift amount is '0'.
Figure 10B:
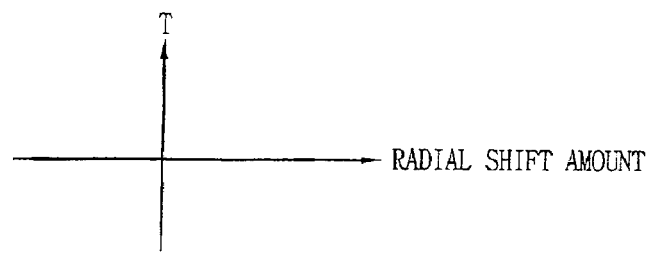
FIG. 10B is a graph showing a value 'T' when the radial shift amount is '0'.

FIG. 10A is a graph showing a value 'T' according to a variation of a tilt amount when a radial shift amount is '0', and FIG. 10B is a graph showing a value 'T' when the radial shift amount is '0'.

As shown in FIGS. 10A and 10B, in equation (4), by obtaining a difference between the partial push-pull values P1 and P2, 'k' for making the value of the radial shift to be '0' can be obtained. Through this process, the value 'T' can be obtained depending only on the tilt amount.

In order to simplify the above described computation process, the similar result can be obtained by using the left and right light amount difference of the upper portion of the diffraction pattern of the photo diode 440 or the left and right light amount difference of the lower portion of the diffraction pattern of the photo diode 440.

That is, it can be simplified to T=(A1−B1)−k(A2−B2) or T=(D1−C1) −k(D2−C2), wherein 'k' is a constant.

Figure 11:
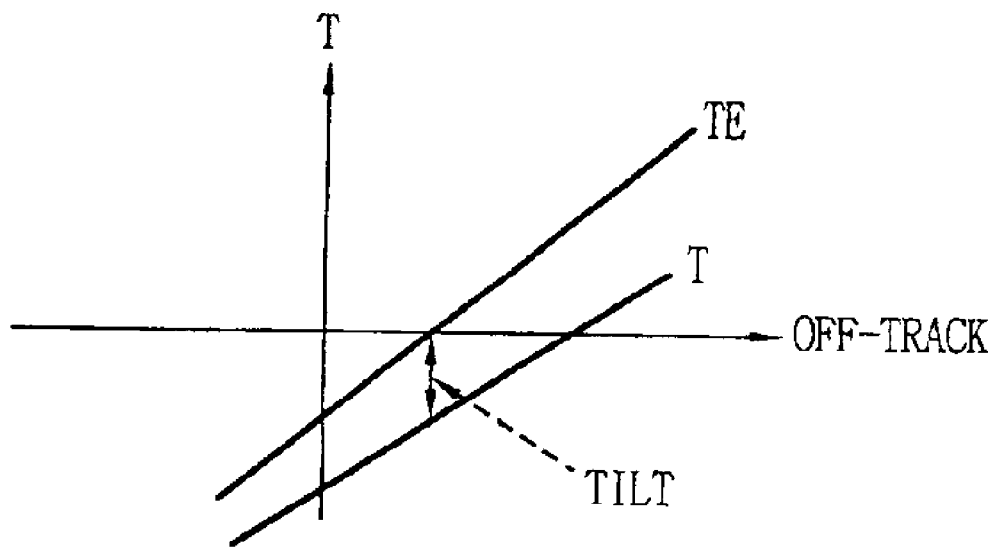
FIG. 11 is a graph showing how a tilt amount to be corrected is calculated when the value 'T' of FIG. 10A is adopted to an optical pick-up.

FIG. 11 is a graph showing how a tilt amount to be corrected is calculated by using the obtained tilt value.

In FIG. 11, a difference between the value 'T' when the radial shift amount is '0' and a pre-set tracking error value (TE) is obtained and the difference value is used as a tilt amount.

In a different embodiment of the present invention, in the tilt detecting apparatus, in case that the method for compensating a tilt adopts an astigmatism method, the diffraction pattern of beam in the photo diode is rotated by 90°, and accordingly, the value 'T' is computed by equation (5) with 90° rotation:

$$T=[(A1+B1)-(C1+D1)]-k*[(A2+B2)-(C2+D2)] \quad (5)$$

wherein 'k' is a constant.

Figure 12:
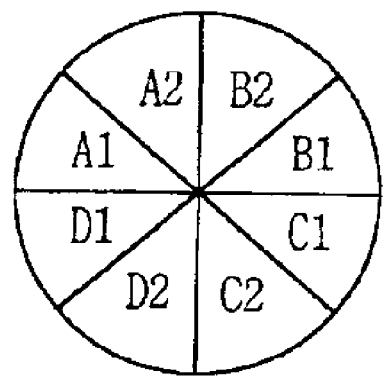
FIG. 12 is a view showing a hologram pattern adopted in the present invention.

FIG. 12 is a view showing a hologram pattern adopted in the present invention.

As shown in FIG. 12, a hologram (not shown) is installed in front of or behind the photo diode 440. After the reflected light diffracted at the information-recording medium 100 is transmitted through the objective lens, the refraction pattern is formed according to the shape of the photo diode and a partial light of a desired diffraction pattern is irradiated to the photo diode cell of a desired position. Then, an accurate tilt amount can be detected.

As so far described, the radial tilt detecting apparatus of the present invention has the following advantage.

That is, a portion of the reflected light diffracted at the information-recording medium is detected by using the 8-divided photo diode 440, the region having a large difference in a light amount by the tilt and the region having a small difference in a light amount by the tilt in view of the characteristic of the reflected light are detected. And then, after push-pull values of each region are computed to remove an influence of the radial shift by using the two push-pull values, a corresponding difference between the tilt amounts, thereby obtaining an accurate tilt direction and degree of the information-recording medium 100.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A recording/reproducing apparatus of an information-recording medium comprising:
   a photo-detecting device for detecting a light beam reflected from the information-recording medium, the photo-detecting device detecting a light amount signal of a region having a large change in a light amount and a light amount signal of a region having a small change in a light amount according to a tilt amount of the information-recording medium;
   a processing device for processing signals of the plurality of light beams detected by said photo-detecting device to supply a push-pull value of each region; and
   a tilt controller for compensating an influence of a radial shift by using the two push-pull values from the processing device.

2. The apparatus of claim 1, wherein the photo-detecting device has eight regions that are evenly divided in size, and wherein signals detected in said regions are designated by A1, A2, B2, B1, C1, C2, D2 and D1 starting from seventh octant of the eight regions.

3. The apparatus of claim 2, wherein the processing device produces two push-pull signals P1 and P2, where P1=(A1+D1)−(B1+C1) and P2=(A2+D2)−(B2+C2); and outputs a tilt information signal T according to a following equation:

$$T=P1-k*P2$$

wherein k is a constant to minimize the influence of a radial shift.

4. The apparatus of claim 1, further comprising:
   a hologram means installed on an optical path of the light beam reflected from the information-recording medium.

5. A tilt detecting method of an information-recording medium comprising the steps of:
   detecting a light amount signal of a region having a large change in a light amount and a light amount signal of a region having a small change in a light amount according to a tilt amount of the information-recording medium;
   calculating a push-pull value of each region; and
   removing an influence of a radial shift by using the two push-pull values.

6. The method of claim 5, wherein, in the step of detecting a light amount signal, the reflected light reflected from the information-recording medium is divided into regions that are left and right sides of vertical lines, and a light amount of a region having a large difference in a light amount and a light amount of a region having a small difference in a light amount.

7. The method of claim 5, wherein, the step of calculating a push-pull value comprises:
   obtaining a difference between the light amount signals that are detected from the left and right sides of vertical lines having a large change in a light amount, to obtain a first push-pull value; and
   obtaining a difference between the light amount signals that are detected from the left and right sides of vertical lines having a small change in a light amount variation, to obtain a second push-pull value.

8. The method of claim 5, further
   obtaining a tilt information,
   wherein the step of obtaining the tilt information comprises, multiplying one of the push-pull values by a constant, which minimizes the influence of a radial shift, subtracting the multiplied push-pull value from the other push-pull value, and outputting the tilt information from the subtraction result with substituting determined constant into the subtraction.

9. A tilt detecting method of an information-recording medium comprising the steps of:

dividing a light reflected from an information-recording medium to left and right regions, dividing the left and the right regions to a region having a large change in a light amount and a region having a small change in a light amount;

obtaining a difference between a sum of the left light amount of the region and the sum of the right light amount of the region having the large change in a light amount, and obtaining a first push-pull value;

obtaining a difference between a sum of the left light amount of the region and the sum of the right light amount of the region having the small change in a light amount, and obtaining a second push-pull value;

multiplying the second push-pull value by a constant, subtracting the result value from the first push-pull value, and obtaining a push-pull value depending on a tilt amount; and subtracting the push-pull value from a tracking error value and detecting a tilt value.

10. The method of claim 9, wherein the first push-pull signal is obtained from a difference between a light amount of the region having a relatively large change in a light amount in the upper portion or the lower portion of the left region of the reflected light and a light amount of a region having a relatively large change in a light amount in the upper portion or the lower portion of the right region of the reflected light.

11. The method of claim 9, wherein the second push-pull signal is obtained from a difference between a light amount of the region having a relatively small change in a light amount in the upper portion or the lower portion of the left region of the reflected light and a light amount of a region having a relatively small change in a light amount in the upper portion or the lower portion of the right region of the reflected light.

12. A tilt detecting method of an information-recording medium comprising the steps of:

detecting pluralities of light signals received by a photo-detecting device arranged in a light receiving path, wherein signals detected in eight regions are designated by A1, A2, B2, B1, C1, C2, D2 and D1 starting from seventh octant of the eight regions;

calculating push-pull signals P1 and P2, wherein P1=(A1+D1)−(B1+C1) and P2=(A2+D2)−(B2+C2); and outputting a tilt information signal T according to a following equation $$T=P1k*P2$$

wherein k is a constant to minimize the influence of a radial shift.

13. The method of claim 12, wherein the constant k is a value that satisfies a condition where no variation in the tilt information signal T is found even when there is an intentional radial shift.

14. The method of claim 12, further comprising a step of compensating a tilt of the information-recording medium according to the tilt information signal T by substituting the constant k in the equation.

* * * * *